US012773816B2

(12) United States Patent
Matsushita

(10) Patent No.: US 12,773,816 B2
(45) Date of Patent: Oct. 27, 2026

(54) INJECTION MOLDING MACHINE

(71) Applicant: THE JAPAN STEEL WORKS, LTD., Tokyo (JP)

(72) Inventor: Kazuteru Matsushita, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 154 days.

(21) Appl. No.: 18/671,920

(22) Filed: May 22, 2024

(65) Prior Publication Data

US 2024/0391146 A1 Nov. 28, 2024

(30) Foreign Application Priority Data

May 26, 2023 (JP) ................................ 2023-086698

(51) Int. Cl.
*B29C 45/07* (2006.01)
*B29C 45/64* (2006.01)
*B29C 45/17* (2006.01)

(52) U.S. Cl.
CPC .............. *B29C 45/07* (2013.01); *B29C 45/64* (2013.01); *B29C 2045/1784* (2013.01)

(58) Field of Classification Search
CPC . B29C 45/0408; B29C 45/0441; B29C 45/06; B29C 45/08; B29C 45/14549; B29C 45/1628; B29C 45/1756; B29C 45/1774
See application file for complete search history.

(56) References Cited

U.S. PATENT DOCUMENTS 5,984,716 A * 11/1999 Starkey ............... B29C 33/0083 425/144
2017/0050360 A1* 2/2017 Lehmann ................ B29C 45/77
2019/0193313 A1* 6/2019 Miyaki .................... B29C 45/06
2022/0161472 A1* 5/2022 Yanahara ............ B29C 45/0408
2022/0324148 A1 10/2022 Kosue

FOREIGN PATENT DOCUMENTS

JP 2022-162595 A 10/2022

* cited by examiner

*Primary Examiner* — Thu Khanh T. Nguyen
(74) *Attorney, Agent, or Firm* — Potomac Law Group, PLLC

(57) ABSTRACT

An injection molding machine includes a mold clamping device provided on a bed and an injection device provided on the bed and slidable freely to a front side and to a rear side. The bed and the injection device are connected to each other by one or a plurality of hoses, and at least one of wiring and piping is housed in the hose. The hose is exposed from a first opening opened on a side of the bed to a second opening opened on a side of the injection device and is configured with a predetermined length of slack in an exposed section to facilitate a sliding movement of the injection device. A hose support member is fixed to the injection device below the second opening, and the exposed section of the hose is partially supported by the hose support member.

7 Claims, 5 Drawing Sheets

INJECTION MOLDING MACHINE

CROSS-REFERENCE TO RELATED APPLICATIONS

This application is based on and claims priority under 35 USC 119 from Japanese Patent Application No. 2023-086698 filed on May 26, 2023, the entire content of which is incorporated herein by reference.

TECHNICAL FIELD

The present disclosure relates to an injection molding machine including a mold clamping device provided on a bed and an injection device also provided on the bed, in which the injection device is slidable freely on the bed to a front side, which is a direction toward the mold clamping device, and to a rear side, which is an opposite direction.

BACKGROUND

An injection molding machine includes a mold clamping device for clamping a mold, an injection device for melting an injection material and injecting the molten material into the mold, and the like. As described in, for example, JP2022-162595A, a so-called horizontal injection molding machine includes a mold clamping device provided on a bed and an injection device provided on a side of the mold clamping device on the bed. The injection device is provided to slide freely on the bed. When the injection device slides toward the mold clamping device, that is, to a front side, an injection nozzle of the injection device touches a mold provided in the mold clamping device. When the injection device slides in an opposite direction, that is, to a rear side, the injection nozzle is separated from the mold. The injection device can be maintained by, for example, rotating the injection device.

SUMMARY

A control panel of the injection molding machine is installed in the bed, and the control panel and the injection device are connected by wiring. The wiring is contained in one or more hoses. The hose is exposed from a predetermined position on a side of the bed and inserted into the injection device from a side of the injection device. That is, the hose is exposed to a side of the injection molding machine. A slack is secured in an exposed portion of the hose. Such a slack in the hose allows the injection device to slide on the bed. The hose may house a pipe instead of the wiring, or may house both the wiring and the pipe.

The hose has the necessary slack in the exposed portion to enable sliding of the injection device. However, there is a problem that the slack causes the hose to bend at a large curvature due to the weight of the hose, and the hose and the wiring housed inside are likely to deteriorate. Specifically, for a model in which a slide length of the injection device is extensive, it is necessary to ensure a large amount of slack in the hose, and this factor has a notable influence.

Illustrative aspects of the present disclosure provide an injection molding machine that prevents deterioration of a hose connecting a bed and an injection device.

Other problems and novel features will become apparent from description of the present description and the accompanying drawings.

An injection molding machine includes: a mold clamping device provided on a bed; and an injection device provided on the bed, the injection device being slidable freely to a front side, which is a direction toward the mold clamping device, and to a rear side, which is opposite the front side. The bed and the injection device are connected to each other by one or a plurality of hoses, and at least one of wiring and piping is housed in the hose. The hose is exposed from a first opening to a second opening, the first opening being opened on a side of the bed, the second opening being opened on a side of the injection device, the hose being configured with a predetermined length of slack in an exposed section to facilitate a sliding movement of the injection device. A hose support member is fixed to the injection device below the second opening, and the exposed section of the hose is partially supported by the hose support member.

The present disclosure can prevent deterioration of the hose connecting the bed and the injection device.

DETAILED DESCRIPTION

Figure 1:
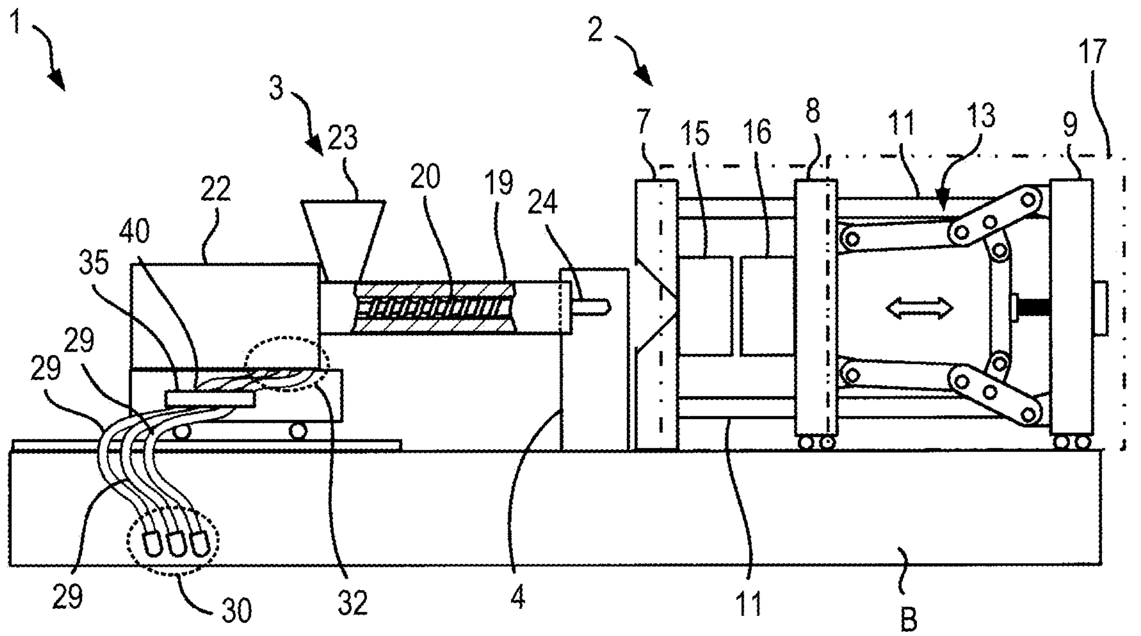
FIG. 1 is a rear view showing an injection molding machine according to the present illustrative embodiment.

Hereinafter, specific illustrative embodiments will be described in detail with reference to the drawings. The present disclosure is not limited to the following illustrative embodiments. In order to clarify the description, the following description and the drawings are simplified as appropriate. In the drawings, the same elements are denoted by the same reference numerals, and repeated description thereof is omitted as necessary. In addition, hatching may be omitted to avoid complicating the drawings.

{Injection Molding Machine}

As shown in FIG. 1, an injection molding machine 1 according to the present illustrative embodiment includes a mold clamping device 2 provided on a bed B, an injection device 3 provided on the bed B and on a side of the mold clamping device 2, and a controller 4 that is configured to control the mold clamping device 2 and the injection device 3. FIG. 1 is a side view of the injection molding machine 1 as viewed from a rear side, that is, the side opposite to an operating side, and the controller 4 is shown behind the injection device 3.

{Mold Clamping Device}

The mold clamping device 2 includes a fixed platen 7 fixed to the bed B, a movable platen 8 provided on the bed B in a slidable manner, and a mold clamping housing 9. The fixed platen 7 and the mold clamping housing 9 are coupled to each other by a plurality of tie bars 11, 11 . . . , and the movable platen 8 is slidable between the fixed platen 7 and the mold clamping housing 9. A mold clamping mechanism, that is, a toggle mechanism 13 in the present illustrative embodiment is provided between the mold clamping housing 9 and the movable platen 8. The fixed platen 7 and the movable platen 8 are provided with a fixed side mold 15 and a movable side mold 16, respectively. Accordingly, the molds 15 and 16 are opened and closed when the toggle mechanism 13 is driven. The mold clamping device 2 is covered with a safety cover 17 as indicated by a two-dot chain line in FIG. 1.

{Injection Device}

The injection device 3 includes a heating cylinder 19, a screw 20 provided in the heating cylinder 19, and a screw driving device 22. The heating cylinder 19 is supported by the screw driving device 22, and the screw 20 is driven by the screw driving device 22 in a rotation direction and an axial direction. The heating cylinder 19 is provided with a hopper 23 and an injection nozzle 24.

{Hose}

The injection molding machine 1 according to the present illustrative embodiment includes hoses 29, 29, . . . that connect the bed B and the injection device 3. The hoses 29, 29, . . . house wiring, pipes, or both, and are configured to exchange electric power and electric signals between the inside of the bed B and the injection device 3 or exchange fluid such as pressure oil. In the present illustrative embodiment, three hoses 29, 29, . . . are provided, but the number may be one, two, or four or more.

The hoses 29, 29, . . . are exposed from the inside of the bed B at a bed side opening 30 (which is one example of a first opening) on a side of the bed B, and then are inserted into the screw driving device 22 at an injection device side opening 32 (which is one example of a second opening) on a side of the screw driving device 22 of the injection device 3. That is, the hoses 29, 29, . . . have an exposed portion from the bed side opening 30 to the injection device side opening 32. The injection device 3 slides freely on the bed B to a front side, which is a direction toward the mold clamping device 2, and to a rear side, which is an opposite direction. The hoses 29, 29, . . . are provided with a slack in this exposed portion, allowing the injection device 3 to slide.

{Hose Support Member}

Figure 2:
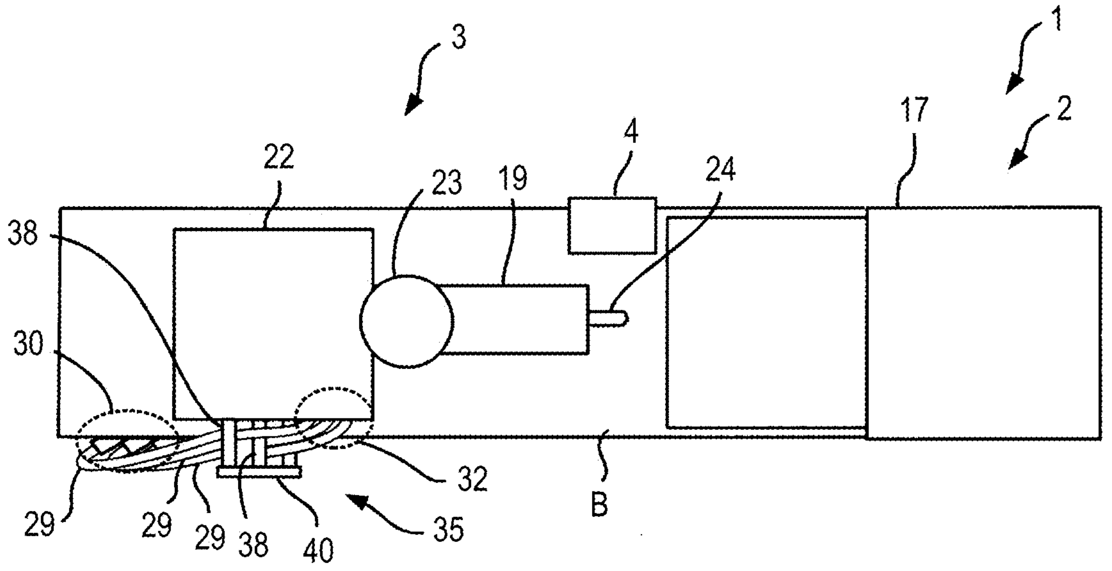
FIG. 2 is a top view of the injection molding machine according to the present illustrative embodiment.

As shown in FIGS. 1 and 2, the injection molding machine 1 according to the present illustrative embodiment is provided with a hose support member 35 on a side of the injection device 3 to support the hoses 29, 29, . . . at a part of the way. The hose support member 35 is provided below the injection device side opening 32 in the injection device 3 and closer to the rear side than the injection device side opening 32.

Figure 3:
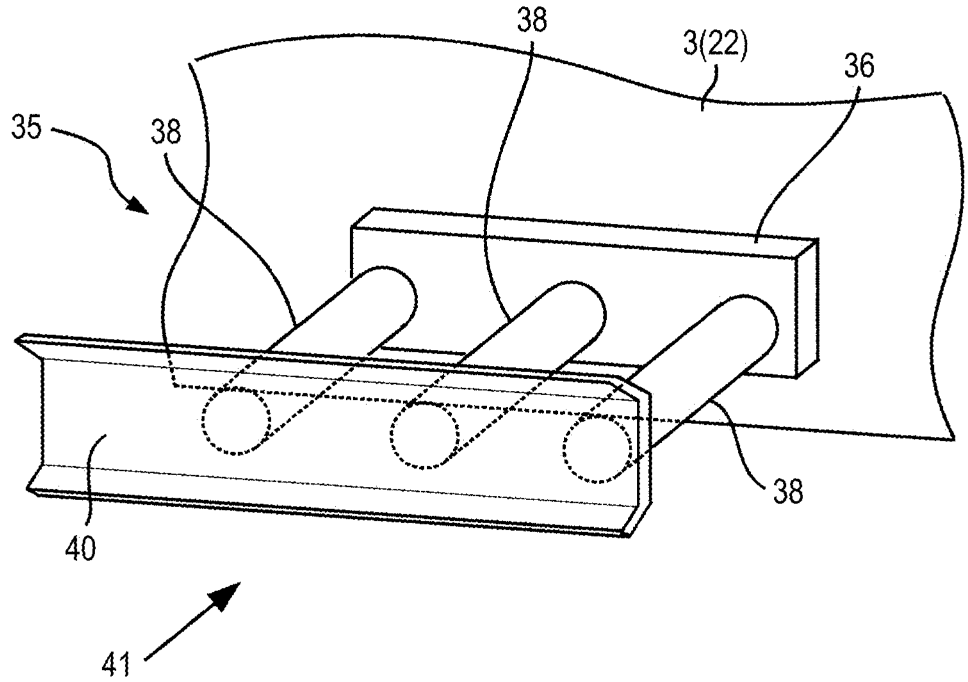
FIG. 3 is a perspective view of a hose support member according to the present illustrative embodiment.
Figure 4:
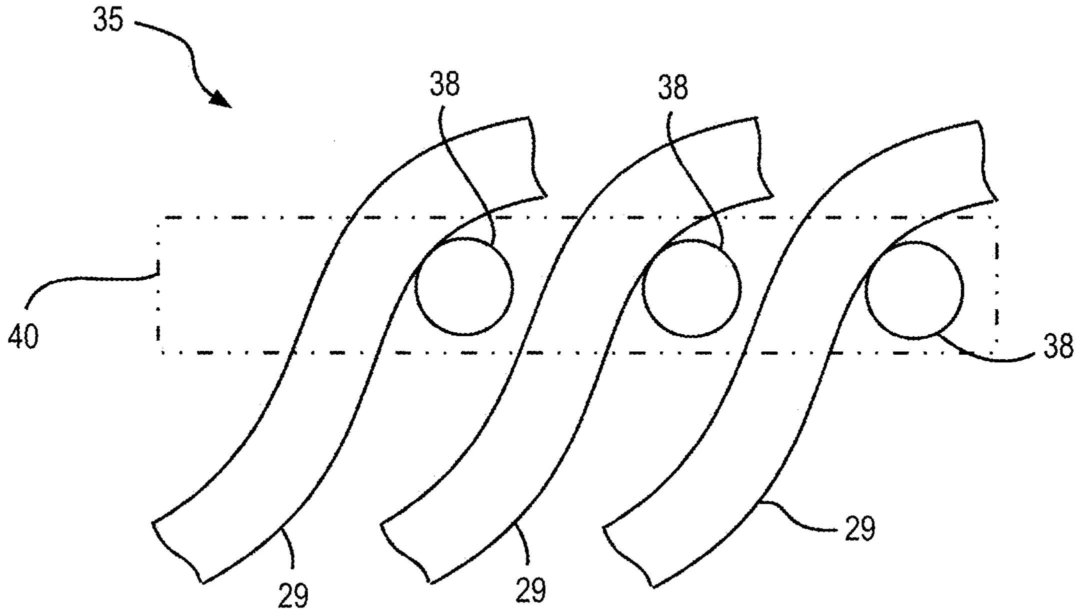
FIG. 4 is a front view showing the hose support member according to the present illustrative embodiment and a part of a hose.

FIG. 3 is an enlarged view of the hose support member 35. The hose support member 35 according to the present illustrative embodiment includes an attachment member 36 fixed to the injection device 3, three cylindrical bars 38, 38, . . . provided horizontally to the attachment member 36, and one holding member 40. The holding member 40 connects tip ends of the bars 38, 38, . . . to each other. In the present illustrative embodiment, three bars 38, 38, . . . are provided. However, the number of bars may be two, or it may be four or more. FIG. 4 shows a view seen from a reference numeral 41 in FIG. 3, and the hoses 29, 29, . . . are inserted between the bars 38, 38, . . . . That is, the hoses 29, 29, . . . are partially supported by the bars 38, 38, . . . . The hoses 29, 29, . . . are held down by the holding member 40 so as to be prevented from coming off the bars 38, 38, . . . .

{Operation}

Figure 5A:
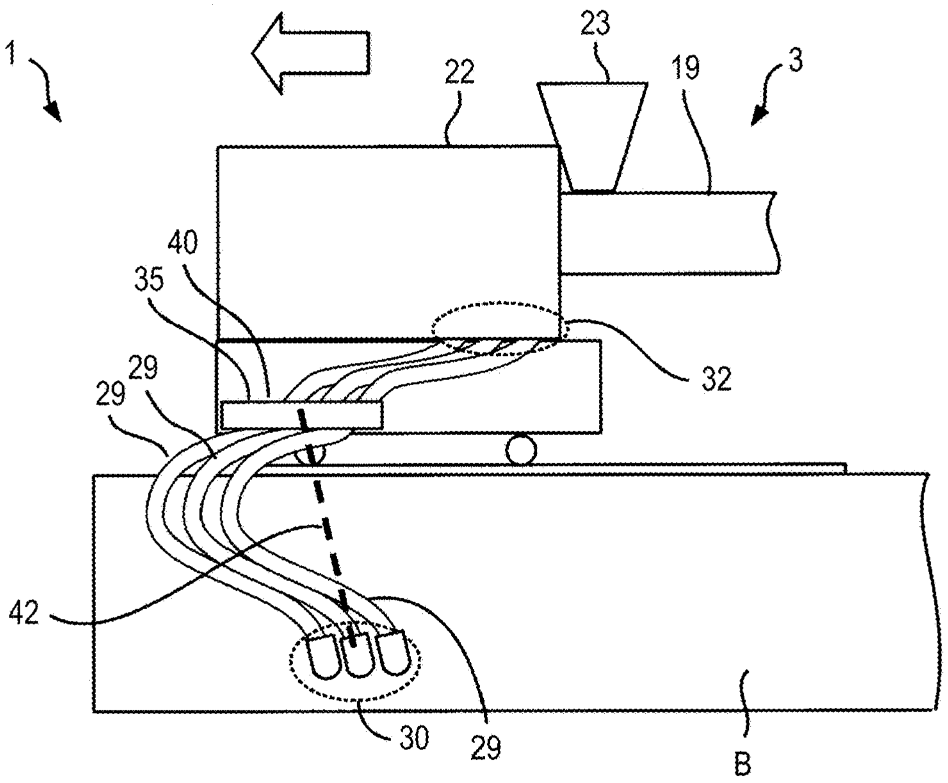
FIG. 5A is a rear view showing a part of the injection molding machine according to the present illustrative embodiment.

An operation of the hose support member 35 according to the present illustrative embodiment will be described. In the injection molding machine 1 including the hose support member 35 according to the present illustrative embodiment, as shown in FIG. 5A, the injection device 3 is slid to a rearmost position. That is, the injection device 3 is moved rearward most. In this case, as indicated by a reference numeral 42, the hose support member 35 is disposed closer to the rear side than the bed side opening 30. Therefore, after exposed from the bed side opening 30, the hoses 29, 29, . . . once move toward the rear side, pass through the hose support member 35, and then move toward the front side to reach the injection device side opening 32. Although the hoses 29, 29, . . . are bent between the bed side opening 30 and the hose support member 35, the curvature thereof is relatively small. This is because the hose support member 35 supports the hoses 29, 29, . . . in the middle. Accordingly, a load acting on the hoses 29, 29, . . . is small.

Figure 5B:
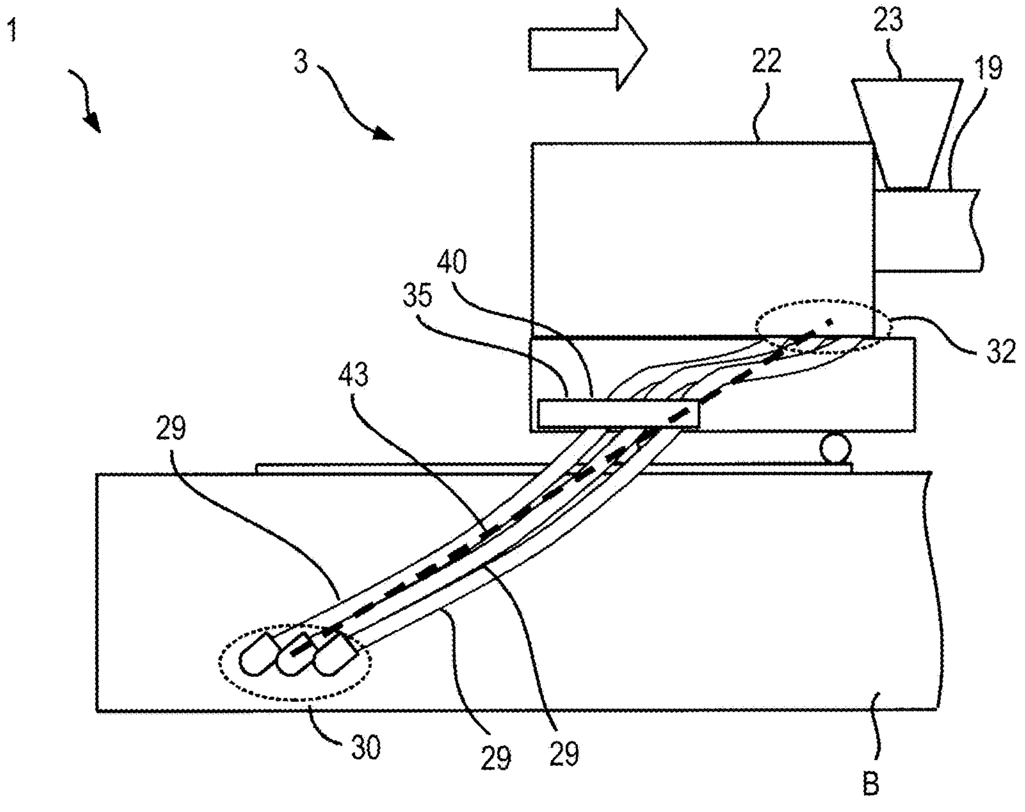
FIG. 5B is a rear view showing a part of the injection molding machine according to the present illustrative embodiment.

The injection device 3 is slid to a foremost position as shown in FIG. 5B. That is, the injection device 3 is moved forward most. In this case, as indicated by a reference numeral 43, the bed side opening 30, the hose support member 35, and the injection device side opening 32 are arranged substantially on a straight line. The hoses 29, 29, . . . extend substantially in a straight line, and no load is applied to the hoses 29, 29, . . . .

Comparative Example

Figure 6:
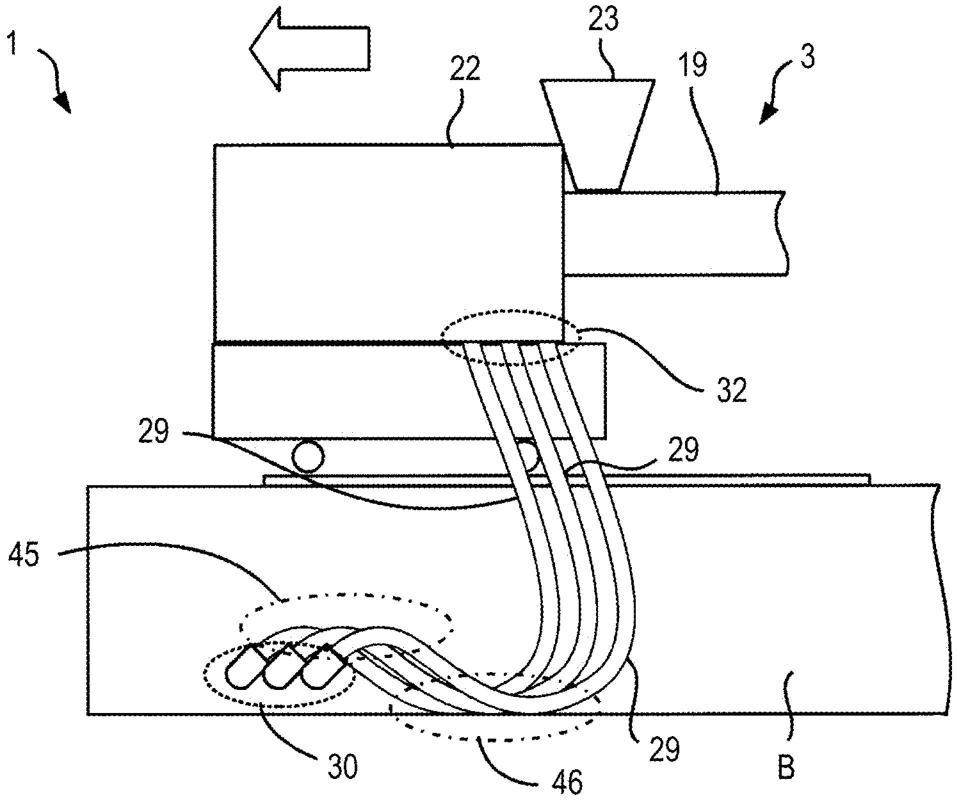
FIG. 6 is a rear view showing a part of an injection molding machine according to a comparative example.

A case where the hose support member 35 according to the present illustrative embodiment is removed from the injection molding machine 1 according to the present illustrative embodiment will be described as a comparative example. Such a comparative example is shown in FIG. 6. In a case where the hose support member 35 (see FIG. 3) is removed, when the injection device 3 is moved rearward most, the hoses 29, 29, . . . are largely bent as shown in FIG. 6. Specifically, a portion indicated by a reference numeral 45 is bent at a large curvature. Accordingly, in this portion, the hoses 29, 29, . . . as well as wiring and pipes housed in the hoses 29, 29, . . . are easily deteriorated. In addition, the hoses 29, 29, . . . may come into contact with a floor surface at a portion indicated by a reference numeral 46, or the portion that is largely bent may swing greatly and collide with a side plate of the bed B when the injection device is moved. In such a case, the hoses 29, 29, . . . are likely to wear due to repeated impact, leading to early deterioration. The prevention of deterioration of the hoses 29, 29, . . . by the hose support member 35 (see FIG. 5A) according to the present illustrative embodiment can be understood by comparison with this comparative example.

First Modification

Figure 7A:
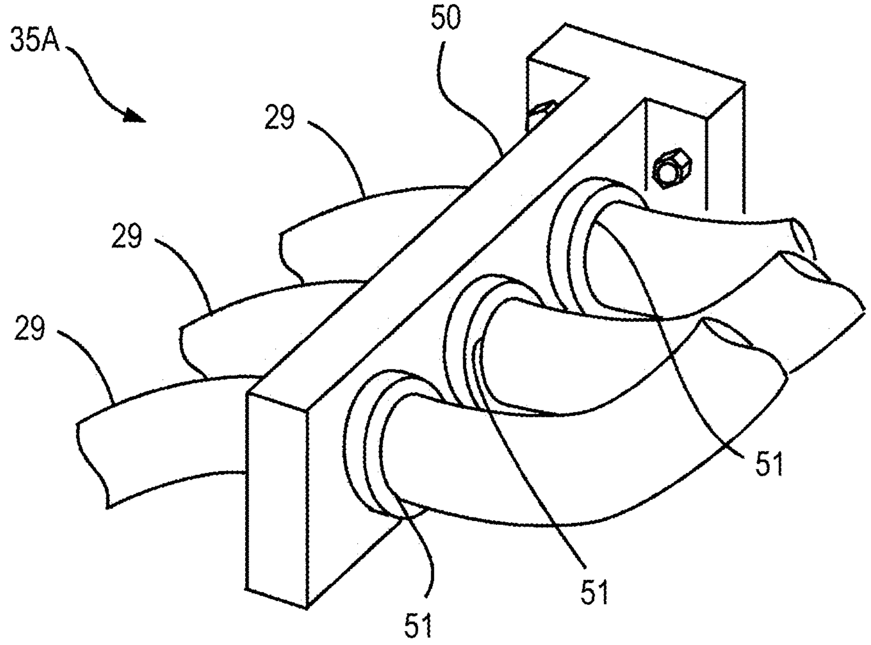
FIG. 7A is a perspective view of a hose support member according to a first modification of the present illustrative embodiment.

The hose support member 35 according to the present illustrative embodiment may be variously deformed. For example, the hose support member 35 may be modified as shown in FIG. 7A. A hose support member 35A according to a first modification of the present illustrative embodiment is a so-called pipe support. That is, three holes 51, 51, . . . are formed in a plate-like support member 50 attached to the injection device 3 (see FIG. 1). The hoses 29, 29, . . . pass through the holes 51, 51, . . . so that the hoses 29, 29, . . . are supported. The number of the hoses 29, 29, . . . may be one or more in the above description, and the number of the holes 51, 51, . . . may be increased or decreased according to the number of the hoses 29, 29, . . . .

Second Modification

Figure 7B:
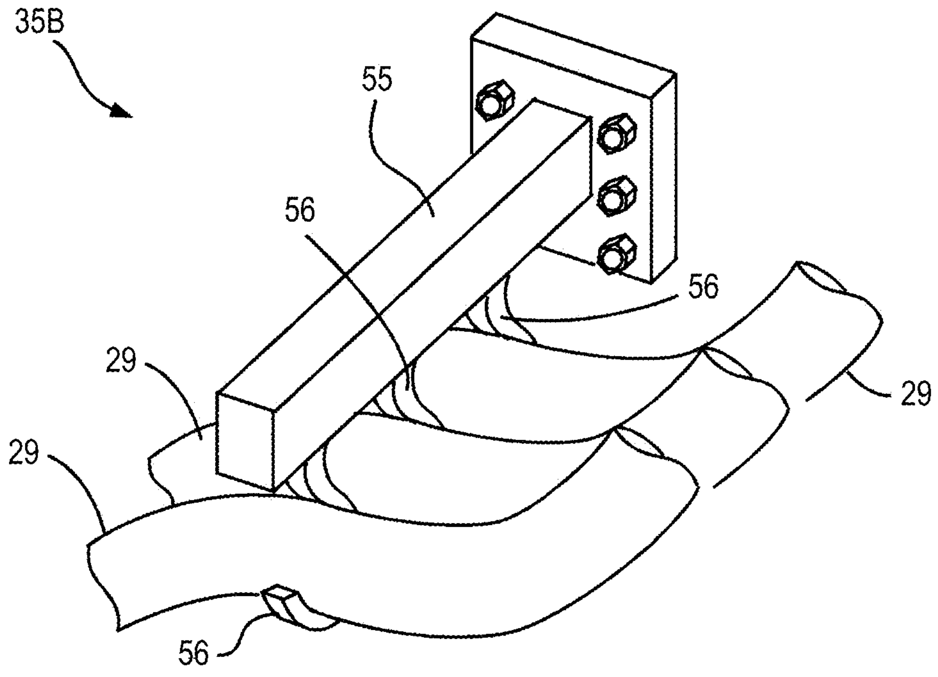
FIG. 7B is a perspective view of a hose support member according to a second modification of the present illustrative embodiment.

FIG. 7B shows a hose support member 35B according to a second modification of the present illustrative embodiment. In the second modification, the hose support member 35B includes a support member 55 to be attached to the injection device 3 (see FIG. 1), and three hooks 56, 56, . . . provided on the support member 55. The hoses 29, 29, . . . are supported by the hooks 56, 56, . . . . The number of the hooks 56, 56, . . . may be increased or decreased according to the number of the hoses 29, 29, . . . .

Third Modification

Figure 7C:
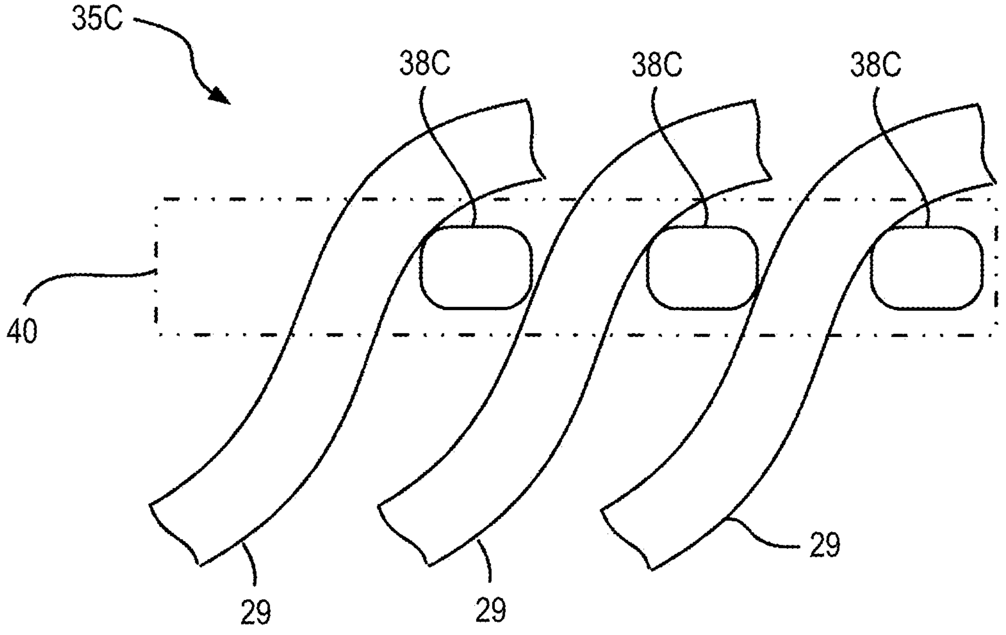
FIG. 7C is a front view showing a hose support member according to a third modification of the present illustrative embodiment and a part of the hose.

FIG. 7C shows a hose support member 35C according to a third modification of the present illustrative embodiment. In the hose support member 35C according to the third modification, bars 38C, 38C, . . . are modified as compared to that in the hose support member 35 (see FIG. 3) according to the present illustrative embodiment. In the third modification, each of the bars 38C, 38C, . . . has a substantially rectangular cross section instead of a cylindrical shape. Each vertex of the rectangle is rounded. That is, each vertex is curved. Accordingly, even when the bars 38C, 38C, . . . come into contact with the hoses 29, 29, . . . , no load is applied to the hoses 29, 29, . . . , and deterioration of the hoses 29, 29, . . . is prevented.

Although the invention made by the present inventors is specifically described based on the illustrative embodiments, it is needless to say that the present invention is not limited to the illustrative embodiments described above, and various modifications can be made without departing from the scope of the invention. The plurality of examples described above may be appropriately combined.

What is claimed is:

1. An injection molding machine comprising:

a mold clamping device provided on a bed; and an injection device provided on the bed, the injection device including a screw and a screw driving device configured to drive the screw in an axial and a rotational direction, the injection device being slidable to a front side, which is a direction toward the mold clamping device, and to a rear side, which is opposite the front side, wherein the bed and the injection device are connected to each other by one or a plurality of hoses, and at least one of wiring and piping is housed in the hose, wherein the hose is exposed from a first opening to a second opening, the first opening being opened on a side of the bed, the second opening being opened on a side of the screw driving device, the hose being configured with a predetermined length of slack in an exposed section to facilitate a sliding movement of the injection device, and wherein a hose support member is fixed to the injection device below the second opening in the screw driving device, and a portion of the exposed section of the hose is supported by the hose support member.

2. The injection molding machine according to claim 1, wherein the hose support member is provided closer to the rear side than the second opening.

3. The injection molding machine according to claim 1, wherein in a case where the injection device is slid to a forefront, the second opening, the hose support member, and the first opening are arranged in a straight line.

4. The injection molding machine according to claim 1, wherein the hose support member has a curved portion in contact with the hose.

5. The injection molding machine according to claim 1, wherein the hose support member includes a plurality of cylindrical bars provided horizontally at a predetermined interval, and the hose is inserted between the plurality of bars.

6. The injection molding machine according to claim 5, wherein tip ends of the plurality of bars are connected to each other by a single horizontal holding member, and the hose is held down by the holding member to be prevented from coming off.

7. The injection molding machine according to claim 1, wherein the hose support member includes a hook configured to hook the hose.

* * * * *